United States Patent
Kudo et al.

[11] Patent Number: 6,152,103
[45] Date of Patent: Nov. 28, 2000

[54] DIRECT FUEL INJECTION IGNITION ENGINE

[75] Inventors: Hidetoshi Kudo; Noriyuki Ota; Masashi Marubara; Hiroyuki Yamashita, all of Hiroshima-ken, Japan

[73] Assignee: Mazda Motor Corporation, Hiroshima-Ken, Japan

[21] Appl. No.: 09/191,512

[22] Filed: Nov. 13, 1998

[30] Foreign Application Priority Data

Nov. 14, 1997 [JP] Japan .................................... 9-313692

[51] Int. Cl.$^7$ .................................. F02B 3/00; F02B 19/00
[52] U.S. Cl. ............................................ 123/298; 123/261
[58] Field of Search .................................... 123/260, 261, 123/262, 276, 279, 280, 285, 298

[56] References Cited

U.S. PATENT DOCUMENTS

| | | | |
|---|---|---|---|
| 4,958,604 | 9/1990 | Hashimoto | 123/276 |
| 5,553,588 | 9/1996 | Gono et al. | 123/276 |
| 5,709,189 | 1/1998 | Monnier | 123/260 |
| 5,711,269 | 1/1998 | Oda et al. | 123/262 |

FOREIGN PATENT DOCUMENTS

| | | | |
|---|---|---|---|
| 0519 275 A1 | 12/1992 | European Pat. Off. | F02B 23/10 |
| 0 694 682 A1 | 1/1996 | European Pat. Off. | F02B 23/10 |
| 5-018244 | 1/1993 | Japan | F02B 23/10 |
| 2-527653 | 12/1996 | Japan . | |

*Primary Examiner*—Henry C. Yuen
*Assistant Examiner*—Mahmoud M. Gimie
*Attorney, Agent, or Firm*—Sidley & Austin; Hugh A. Abrams

[57] ABSTRACT

A direct fuel injection ignition engine includes combustion chambers with a pent roof type ceiling. Each piston has a top surface with a configuration complementary to the combustion chamber ceiling. A fuel injector is disposed at a peripheral portion of the combustion chamber and injects fuel toward the center portion of the top surface of the piston. A cavity is formed on the top surface of the piston. The cavity has a configuration of an elongated circle with a substantially flat bottom surface. The surrounding side wall of the cavity is substantially upright in relation to the bottom surface. A cavity centerline drawn through the longitudinal axis of the cavity is perpendicular to the injection axis line and offset from the center of the piston toward the injector.

8 Claims, 4 Drawing Sheets

DIRECT FUEL INJECTION IGNITION ENGINE

BACKGROUND OF THE INVENTION

1. Field of the Invention

The present invention relates to a direct fuel injection ignition engine in which a cavity is formed on a top of a piston, in particular, to a configuration of the cavity of the direct fuel injection ignition engine.

2. Related Art

Conventionally, it has been known a direct fuel injection ignition engine an ignition plug is disposed along substantially a cylinder axis line of a combustion chamber and that an injector is disposed at a peripheral portion of the combustion chamber so as to inject a fuel directly into the combustion chamber. In this type of engine, for example, a fuel from the injector is injected obliquely downwardly toward the piston top at a compression stroke when the engine is in a low engine load and speed operating area so as to concentrate a combustion mixture around the ignition plug to accomplish a stratification combustion. As a result, a mean air fuel ratio is greatly increased or the combustion mixture is largely made lean.

In order to facilitate the stratified combustion, for example, as shown in Japanese Utility Model Registration No. 2527653, it is proposed that a cavity is formed on the top surface of the piston offset toward the injector (or intake port) and a projected portion projected toward a lower surface of the cylinder head is formed close to the opposite side of the injector or to the exhaust port.

With this structure, the injected fuel from the injector is trapped by the cavity and is facilitated to be vaporized by means of a swirl produced in the combustion chamber and introduced around the ignition plug to thereby accomplish a desirable stratification of the combustion mixture.

However, the conventional engine is disadvantageous in that the desirable stratification cannot be accomplished unless the cavity is properly formed.

For example, where the size of the cavity is too small in the axis direction of the cylinder, the injected fuel is excessively curved due to the swirl in a extreme low engine load operating area so that most of the injected fuel is diverted outside of the cavity and thus is not trapped by the cavity. As a result, the air fuel ratio around the ignition plug is undesirably increased or an undesirable lean combustion mixture is produced around the ignition plug. It is necessary to advance the fuel ignition timing in a relatively high engine load operating condition where the stratified combustion is executed. In this case, the fuel is injected under a low pressure in the combustion chamber so that the injected fuel enhanced in its injection force to be forwarded straightly without being influenced by the swirl. Thus, most of the injected fuel is trapped by the cavity. If the size of the cavity is too large in the axis direction of the cylinder, the injected fuel is not dispersed enough in the cavity. Therefore, the air fuel ratio around the ignition plug is undesirably small or the combustion mixture is undesirably made rich.

In addition, if the depth of the cavity (the height of a side wall of the cavity opposite to the injector) is too small, the injected fuel is carried over the top of the side wall of the cavity. Further, the fuel amount attached to a bottom surface of the cavity is increased so that the vaporization of the fuel is deteriorated. As a result, the air fuel ratio around the ignition plug is undesirably increased.

SUMMARY OF THE INVENTION

Therefore, an object of the invention is to provide a direct injection ignition engine forming a cavity on a top surface of the piston so as to accomplish an appropriate stratified combustion.

In particular, an object of the invention is to provide an appropriate configuration of the cavity formed on the top surface of the piston to suppress the fuel attachment to the bottom surface of the cavity in a relatively wide range of the engine operating condition.

A further object of the invention is to provide a direct injection ignition engine having a cavity suitable for the stratified combustion.

A further object of the invention is to provide a direct injection ignition engine which can improve a trap performance of the injected fuel by the cavity to thereby improve the fuel consumption efficiency and the combustion performance.

In order to accomplish the above objects, according to the present invention, a distance (D1) between the fuel injection axis line and a point (a) of a peripheral wall portion of the cavity wherein (a); a cross point of a peripheral wall portion of the cavity with the cavity center line at a plan view of the top surface of the piston at a side to which the injected fuel is diverted due to the swirl has a value greater than a predetermined value. The height of a cavity side wall opposite to a side of the injector has a value greater than a predetermined value. Specifically, a direct injection ignition engine according to the present invention comprises an injector disposed at a peripheral portion of a combustion chamber with a pent roof type ceiling, having a fuel injection axis line oblique to a cylinder axis line, a piston with a top surface of a complementary configuration to the pent roof ceiling of the combustion chamber, a cavity formed on the top surface of the piston, having a cavity center line perpendicular to the injection axis line and offset from a center of the piston toward the injector in a plan view, an ignition plug disposed on substantially the cylinder axis of the combustion chamber, a swirl generator which generates a swirl in the combustion chamber so that the fuel is injected from the injector toward the cavity to concentrate a combustion mixture around the ignition plug, a distance (D1) between the fuel injection axis line and a point (a) of a peripheral wall portion of the cavity being determined to satisfy the following relationship;

$$D1 \geq L \times \tan(\theta 0/2 + \theta 1)$$

wherein a; a cross point of a peripheral wall portion of the cavity with the cavity center line at a plan view of the top surface of the piston at a side to which the injected fuel is diverted due to the swirl, θ0; spray angle of the fuel injected in the compression stroke, θ1; the maximum value of the diverted angle of the injected fuel, L1; distance between a nozzle of the injector and the cavity center line, a height H of a side wall of the cavity being determined to satisfy the following relationship in a sectional view passing the fuel injection axis line and the cylinder axis, $$H \geq H\text{min}$$

wherein Hmin: a length along the cylinder ax line of a distance between a tip end point (c) and a cross point (d), c; a tip end point on the side wall of the cavity on which the upper spray line passes.

d; a cross point of the fuel injection axis line with a line with a right angle to the fuel injection line and passing the tip end point (c) when an upper spray limit line passes the tip end point (c) of the side wall of the cavity.

According to the above feature of the present invention, the distance (D1) between the fuel injection axis line and the point (a) of a peripheral wall portion of the cavity at the side to which the injected fuel is diverted due to the swirl is determined a value greater than a predetermined value. As a result, an injected fuel can be substantially completely trapped in the cavity 6 notwithstanding of the diversion of the injected fuel due to the swirl and introduce the combustion mixture toward the ignition plug by virtue of the swirl in the cavity. Accordingly, a local value of the air fuel ratio around the ignition plug can be kept from resulting in an unduly small value. In addition, the height H of the cavity side wall opposite to the injector is determined to have a value greater than a predetermined value. Therefore, the injected fuel is substantially prevented from going beyond the side wall of the cavity at the side opposite to the injector by providing the fuel injection start timing appropriately. As a result, the adherence of the injected fuel to the bottom surface of the cavity 6 can be effectively suppressed. In addition, the injected fuel is prevented from flowing out of the cavity. As a result, a local air fuel ratio around the ignition plug 19 can be controlled to a proper combustible value in a relatively broad range of engine operating condition in which the stratified combustion is desirable. In addition, an improved stratified condition can be obtained and thus, it is possible to improve a combustion performance and fuel consumption efficiency.

In preferred embodiment, a distance (D2) between the fuel injection axis line and a point (b) on the peripheral wall portion of the cavity is determined to satisfy the following relationship;

$$D2 \geq D1$$

wherein b; a cross point of the peripheral wall portion of the cavity with the cavity center line at a plan view of the top surface of the piston at an opposite side to which the injected fuel is diverted due to the swirl. With this feature, the injected fuel can be efficiently diffused in the chamber without the swirl. The local air fuel value can be controlled to a desirable value.

In another feature of the present invention, a height H of a side wall of the cavity is determined to satisfy the following relationship in a sectional view passing the fuel injection axis line and the cylinder axis, $$H \leq Hmax$$

wherein Hmax: a length along the cylinder axis line of a distance between the tip end point (c) and a cross point (e), c; the tip end point on the side wall of the cavity on which the upper spray line passes.

e; a cross point of the line with a right angle to the fuel injection line and passing the tip end point (c) with a lower spray limit line when the upper spray limit line passes the tip end point (c) of the side wall of the cavity.

By providing the injection start timing so that the fuel injected on the upper limit line does not pass beyond the tip end of the side wall of the cavity, the fuel injection axis line is kept from directing to the bottom surface of the cavity as much as possible. In addition, the engine compression ratio can be maintained an appropriate value while keeping the injected fuel from sticking to the bottom surface of the cavity and from flowing out of the cavity.

According to another feature of the present invention, the cavity formed on the top surface is of a configuration of an elongated circle of which length along the cavity center line is longer than the one along the fuel injection axis line. With this feature, the combustion mixture can be smoothly introduced around the ignition plug by virtue of the swirl to thereby facilitate the stratified condition. This means that this feature of the present invention is effected to provide a desirable cavity configuration suitable to the stratified combustion.

In another feature of the present invention, a bottom surface of the cavity is substantially of a flat.

As a result, the trapped fuel can be stably kept in the cavity rather than flow out thereof. In addition, a strong up stream can be produced within the cavity. In addition, the flat bottom surface of the cavity is effected to properly extinguish a tumble (vertical vortex) even when the tumble is produced in the intake stroke. Thus, a down stream due to the tumble can be effectively suppressed in the compression stroke. As a result, the combustion mixture can be smoothly introduced around the ignition plug at an upper position of the combustion chamber even though the cavity is deep.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

Figure 1:
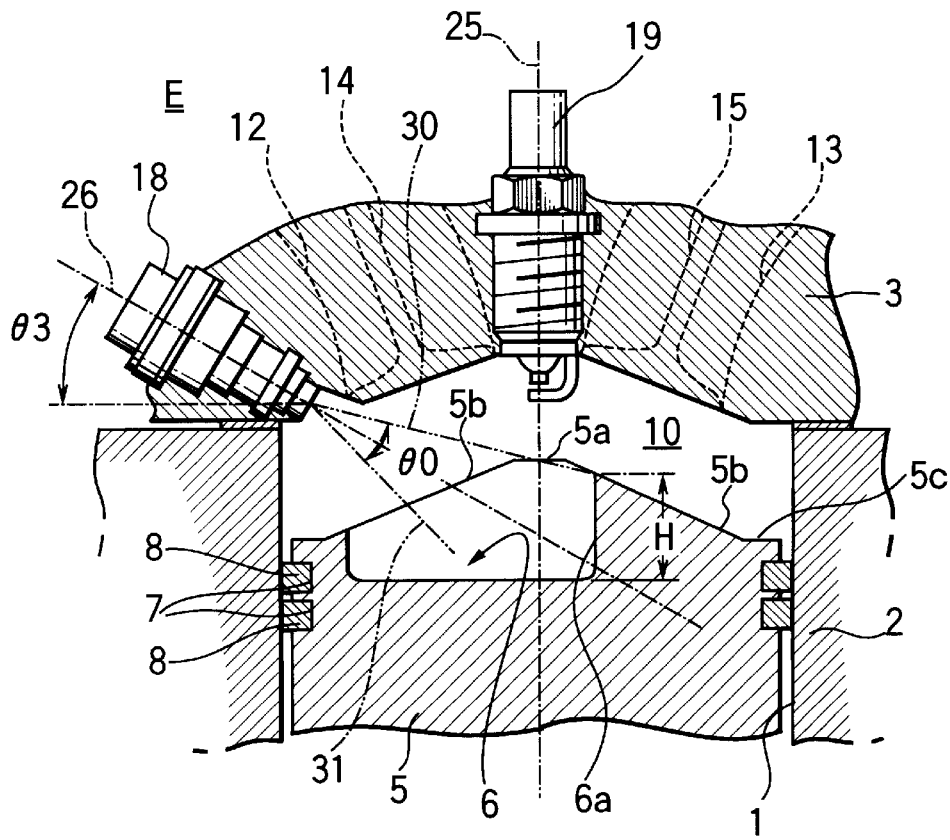
FIG. 1 is a sectional view of an essential portion of a direct injection ignition engine body along an axial line of a cylinder passing a fuel injection line according to the present invention.

Hereinafter, the present invention is described in detail taking reference with the attached drawings. FIG. 1 show an essential portion of a direct injection ignition engine E. The engine is provided with a cylinder block 2 carrying a plurality of cylinders 1, cylinder head 3 disposed on the cylinder block 2. In the cylinder 1 is disposed a piston 5 to be reciprocally moved along an axial direction of the cylinder 1. There are formed a pair of grooves 7 on a circumferential surface in which a pair of piston rings 8 are provided.

Between a top surface of the piston 5 and a lower surface of the cylinder head 3 is formed a combustion chamber 10 in which the lower surface of the cylinder head 3 or ceiling of the combustion chamber 10 is of a pent roof type combustion chamber.

Figure 2:
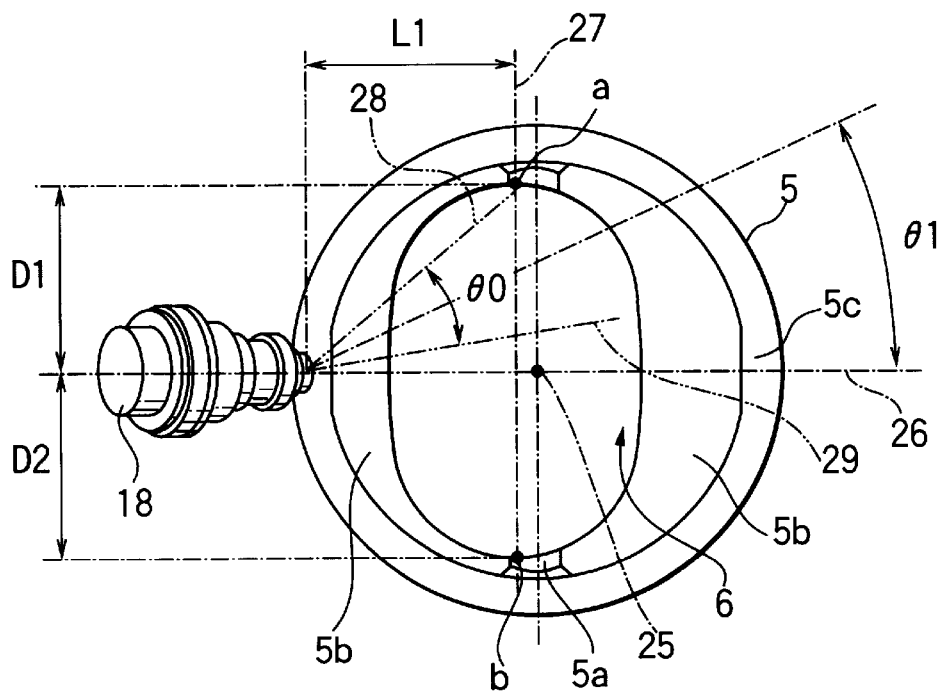
FIG. 2 is a plan view of the top surface of the piston.
Figure 3:
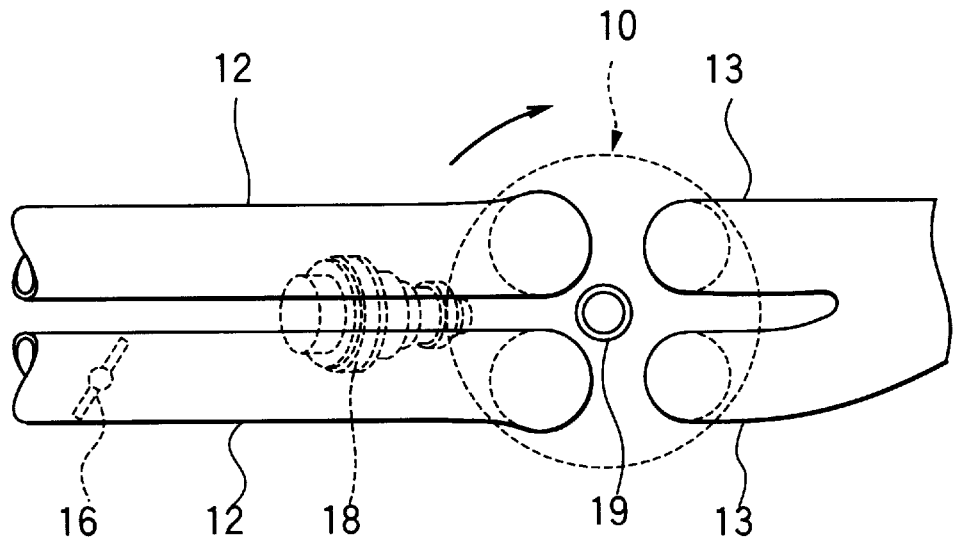
FIG. 3 is a schematic plan view showing an intake and exhaust system of the engine.

As shown in FIG. 3, a pair of intake ports 12, 12 and a pair of exhaust ports 13, 13 are formed on the cylinder head 3. A pair of intake valves 14 and exhaust valves 15 for opening and closing the ports 12 and 13, an injector 18 for directly injecting the fuel in the combustion chamber 10 and an ignition plug 19 are provided in the cylinder head 3. The ignition plug 19 is disposed substantially on the axial line 25 of the cylinder. The fuel injector 18 is disposed between the intake ports 12, 12 in the peripheral portions combustion chamber and a fuel injection axis line 26 coincides with the axis of the injector 18. The line 26 crosses obliquely the cylinder axis line 25. Namely, as shown in FIG. 2, the fuel injection line 26 passes a center of the top surface of the piston 5 which accords with the cylinder axis line 25. The injecting pressure of the injector 18 is about 5–10 MPa so that the fuel injection can be executed in the compression stroke. The fuel is injected to form a conical shape The top surface of the piston is of a configuration that corresponds to a ceiling of the combustion chamber 10. Namely, the top portion of the piston 5 seen from a direction of the cylinder axis line is provided with a pair of horizontal surfaces 5a, 5a extending in a direction passing the center of the top surface of the piston 5 and perpendicular to the fuel injection axis line 26 that a pent-roof configuration is formed at the top portion of the piston 5 in section. From the opposite sides of the horizontal surfaces 5a, 5a are extended downwardly inclined surfaces 5b, 5b respectively. A horizontal surface portion 5c is formed at a peripheral portion of the top surface of the piston. The horizontal surfaces 5a, 5a art provided for preventing a heat spot in the top portion of the piston 5.

The top surface of the piston 5 is formed with a recess or a cavity 6. A bottom surface of the cavity 6 is substantially flat and horizontal and a surrounding side wall of the cavity 6 is substantially upright to the bottom surface. Namely, the side wall is extended substantially in the axial direction 25 of the cylinder. The cavity 6 is of an elongated circle as a plan view having a cavity center line 27 which passes a central portion of the top surface of the piston 5. The cavity 6 is elongated in the direction of the line 27 which extends in a direction perpendicular to the fuel injection line 26. The cavity center line 27 is offset from the center of the top surface of the piston 5 or the cylinder axis 25 toward the injector 18 so that a lower end of the ignition plug 19 is positioned opposite to the injector 18 within the cavity when the piston 4 is at the top dead center of the piston.

With this structure, for instance, at a compression stroke in the low engine speed and load condition, the fuel injection is made from a nozzle of the injector 18 toward the cavity 6 of the top surface of the piston 5 to concentrate the combustion mixture around the ignition plug 19 to accomplish the stratified combustion by means of ignition of the plug 19.

In one of the intake ports 12, 12, a control valve 16 is provided to open and close to thereby control the intake gas flow as shown in FIG. 3, in accordance with the operation of the valve 16. When the intake gas flow is interrupted or restricted in the one of the ports 12, 12, a swirl (vortex component) circulating in a clockwise direction in FIGS. 2 and 3 is produced in the combustion chamber 10 by the intake gas flow in the other intake ports 12, 12. Thus, the control valve 16 provides a swirl producing means for producing the swirl in the chamber 10. When the valve 16 is entirely closed, the swirl is intensified to the maximum level to have the maximum swirl ratio 4.

Figure 4:
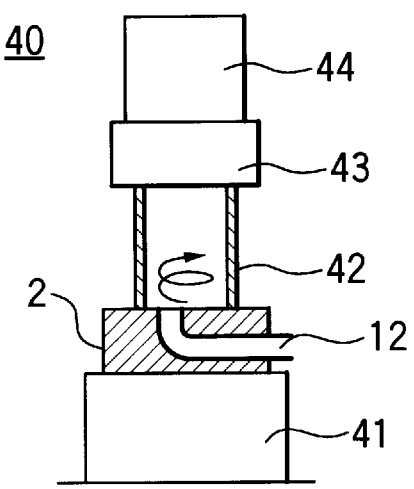
FIG. 4 is a schematic view showing a measuring devise for measuring a swirl ratio of an intake.

An angular speed of the intake gas in the horizontal direction is measured and integrated and the integrated value is divided by an angular speed of the crank angle of the engine. The resultant value is defined as the swirl ratio. The angular speed of the intake gas in the horizontal direction is measured by a measuring device as shown in FIG. 4. In the measuring device 40, the cylinder head 3 is arranged on a base 41 in the up side down. The intake port is connected to the intake gas supply device (not shown). A cylinder 42 is arranged on the cylinder head 3. An impulse meter 44 with a honeycomb shaped rotor 43 is connected to the cylinder 44. The distance between a lower surface of the impulse meter 44 and the upper surface of the cylinder head is determined at a value of 1.75 D wherein D is a diameter of the cylinder bore. In this case, a torque acting on the rotor 43, produced by the swirl, is measured by the impulse meter 44. The angular speed of the intake gas in the horizontal direction is obtained based on the measured value.

In the plan view, a distance D1 is defined between the injection line 26 and a point a in FIG. 2 wherein the point a is positioned at a peripheral portion of the cavity 6 to which the injected fuel is diverted due to the swirl of the intake gas. The distance D1 is provided as follows;

$$D1 \geq L1 \times \tan(\theta 0/2 + \theta 1) = D1\min$$

Wherein θ0: spray angle,

θ1: the maximum angle by which the injected fuel is bent due to the swirl,

L1: the distance between the injection nozzle and the cavity centerline 27.

Figure 5:
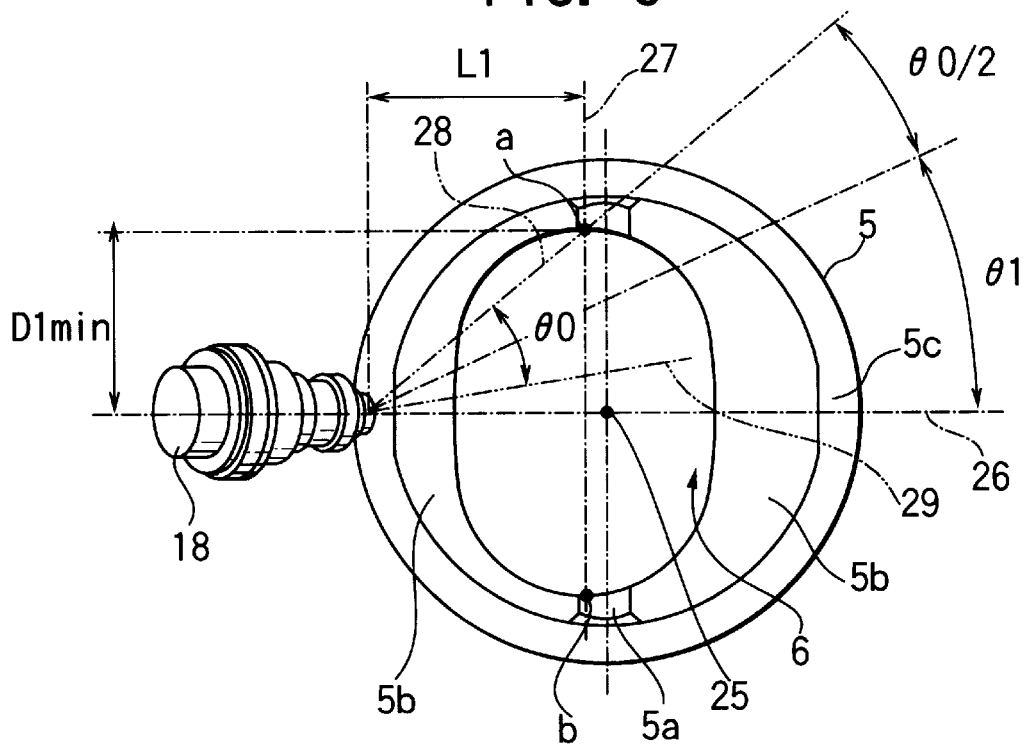
FIG. 5 is a view similar to FIG. 2 showing how to obtain D1min.

Dmin is shown in FIG. 5 which is a plan view of the top portion of the piston 5. In FIG. 5, the spray angle θ0 of the injected fuel from the injector 18 is defined by lines 28 and 29 shown by two dot chain lines. The point a is provided by a cross point of the line 28 and the cavity center line 27. The line 28 is provided so that the point a is located at the inner side of the cavity even though the injected fuel is diverted to the maximum level. In this case, the point a is provided as a cross point of the line 28 and the line 27 as aforementioned. Accordingly, Dmin is determined so as to enable the cavity 6 to trap the injected fuel even though the injected fuel is diverted due to the swirl to the maximum level. The spray angle θ0 of the injected fuel is determined at about 50°±20° degree.

The distance D1 is determined to satisfy the following relationship;

$$D1 \leq D1\max.$$

Figure 6:
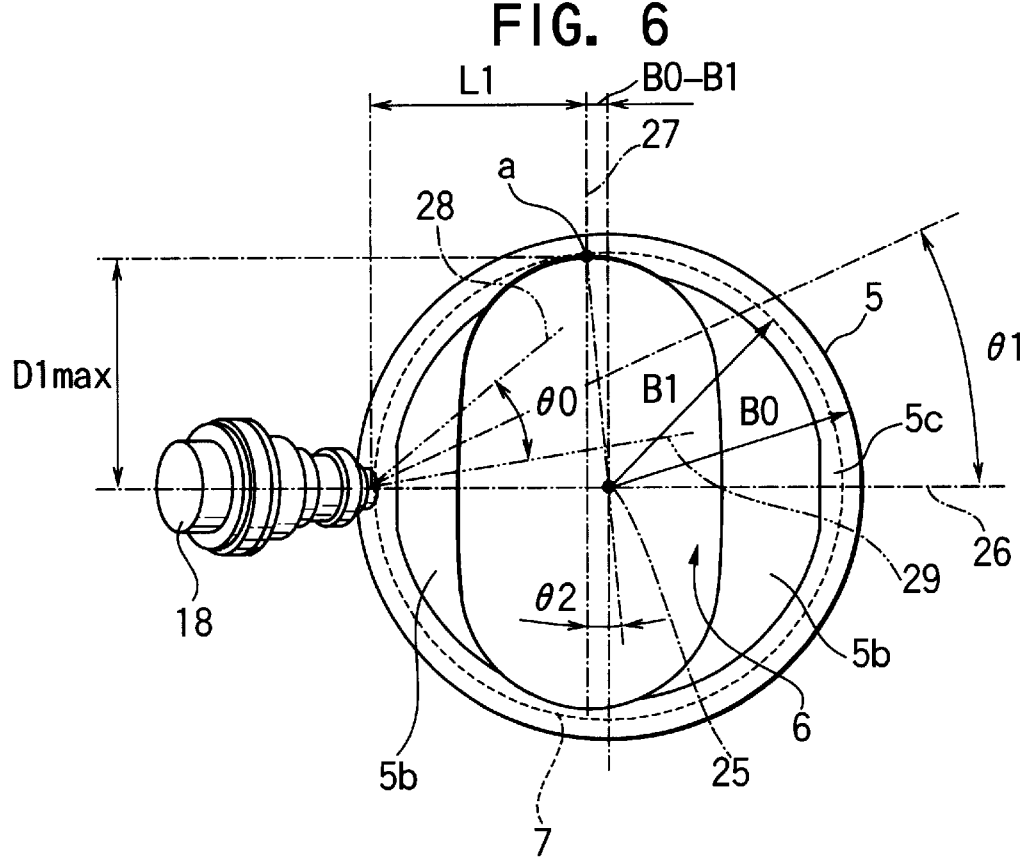
FIG. 6 is a view similar to FIG. 1 showing how to obtain Hmin.

D1max is a value of the distance D1 at a condition that the point a is positioned at a point on the peripheral surface of the cavity 6 of corresponding to a bottom surface of the groove 7 for the piston ring 8 in a radial direction of the piston 5. The angle θ2 in FIG. 6 can be expressed as follows:

$$\theta 2 = \sin^{-1}\{(B0 - B1)/B1\}$$

Wherein B0; radius of piston 5,

B1; radius of the bottom surface of the ring groove 7, and,

B0–B1; distance between the line 27 and the center of the piston or the cylinder axis line 25.

Thus, $$D1max = B1 \times \cos\theta_2 = B1 \times \cos[\sin^{-1}\{(B0-B1)/B0\}]$$

A distance D2 between the fuel injection axis line 26 from the injector 18 and a point (b) on the peripheral surface of the cavity 6 in FIG. 2 is determined to satisfy the following condition;

$$D2 \geq D1$$

Wherein the point b is a cross point with the line 27 on the peripheral surface of the cavity 6 in FIG. 2. The point b is positioned opposite to the point a to which the injected fuel is diverted due to the swirl.

In a sectional view as shown in FIG. 1 at a plane passing the fuel injection line 26, the height H of the side wall 6a of the cavity 6 at a point opposite to the injector 18 is determined to satisfy the following condition;

$$Hmin \leq H \leq Hmax$$

Figure 7:
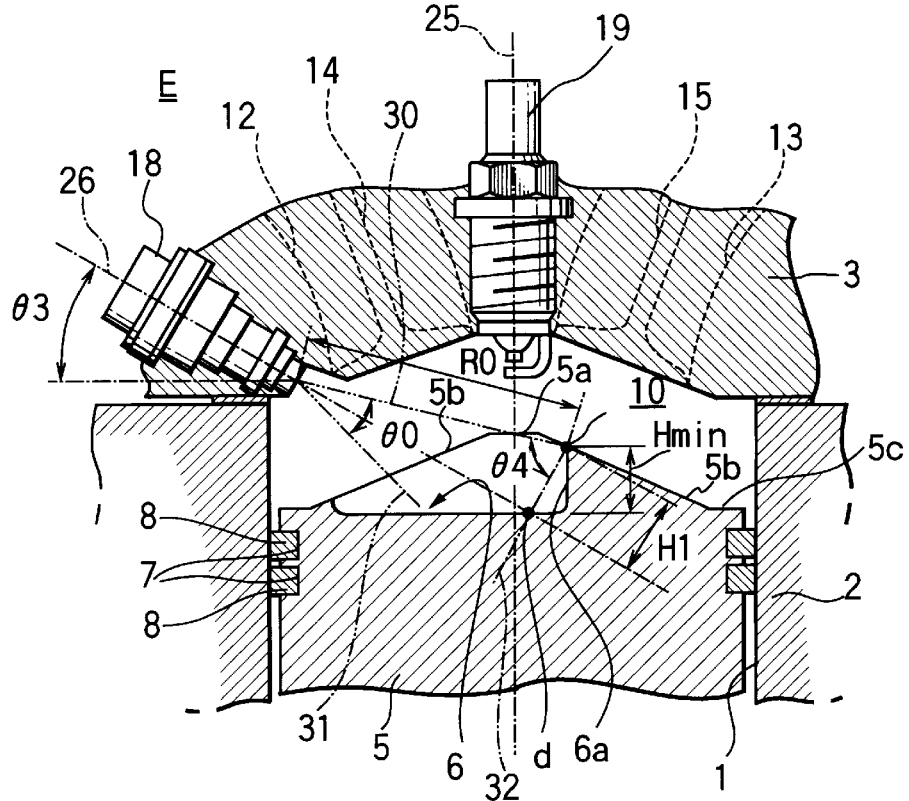
FIG. 7 is a view similar to FIG. 2 showing how to obtain D1max.

Hmin is determined to have the same value as a distance between points c and d in FIG. 7. The spray angle θ0 is defined by an upper line 30 and a lower line 31 in the up and down direction in FIG. 7. The point c is provided to cross a top end of the side wall 6a with the line 30. A line 32 passes the point c and has a right angle with the fuel injection axis line 26. The point d is provided as a cross point of the line 32 with the fuel injection axis line 26. Hmin is determined to be a distance between the points c and d in a direction along the cylinder axis 25 as shown in FIG. 7.

A distance R0 is provided as a distance between the injection nozzle 18 and the top point (c) of the side wall 6a of the cavity 6 along the line 30 as showin in FIG. 7. The distance H1 between the points c and d and an angle shown in FIG. 7 are provided as follows;

$$H1 = R0 \times \sin(\theta_0/2)$$

Considering that an angle θ3 between the fuel injection axis 26 and a plane perpendicular to the cylinder axis 25 is about 40° and the spray angle θ0 is about 50°±20°, Hmin is substantially the same value as H1×sin θ4. Thus, $$Hmin = R0 \times \sin(\theta_0/2) \times \sin(\pi/2 - \theta_0/2).$$

In short, the value Hmin is determined so that the fuel injected on the upper limit line 30 does not pass beyond the top end of the side wall 6a of the cavity 6 and that the fuel of a relatively high density on the injection axis line is not injected toward the bottom surface of the cavity 6. The injection timing is determined taking account of the value of Hmin. Namely, the value Hmin is determined to keep the injected fuel from sticking to the bottom surface of the cavity 6 and from flowing out of the cavity 6.

Figure 8:
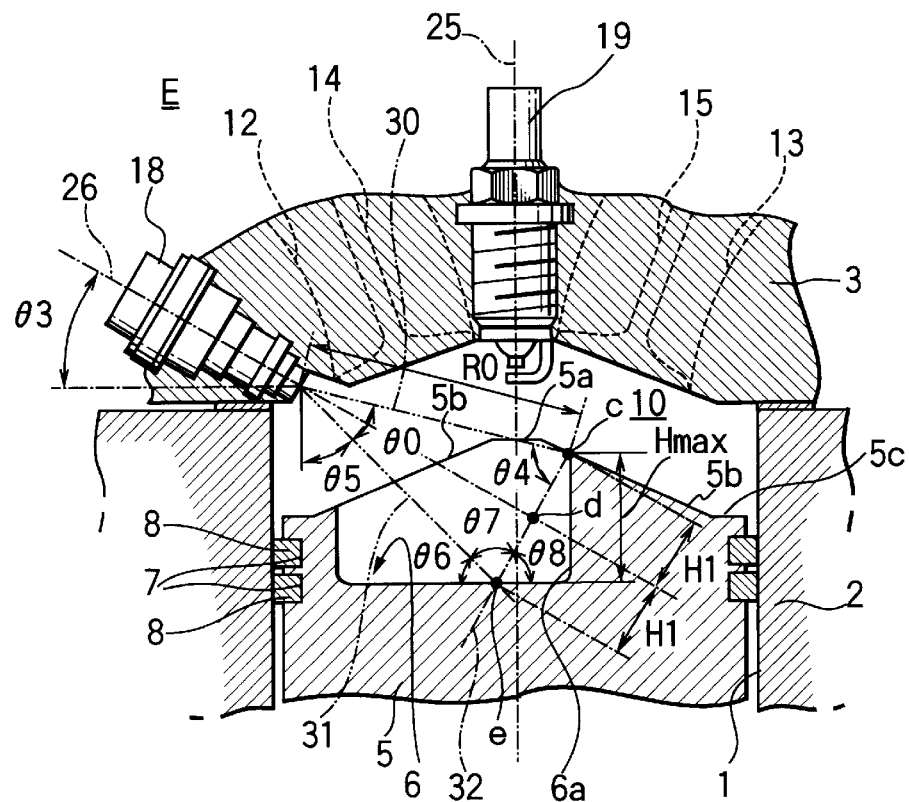
FIG. 8 is a view similar to FIG. 1 showing how to obtain Hmax.

A point (e) is provided as a cross point of the line 32 with a lower spray angle line 31 as shown in FIG. 8. The value of Hmax is the same value as the distance between the points c and e in the direction of the cylinder axis 25. In FIG. 8, angles θ5, θ6, θ7, θ8 can be shown as follows;

$$\theta_5 = \pi/2 - (\theta_3 + \theta_0/2)$$

$$\theta_6 = \pi/2 - \theta_5 = \theta_3 + \theta_0/2$$

$$\theta_7 = \pi/2 - \theta_0/2$$

$$\theta_8 = \pi - (\theta_6 + \theta_7) = \pi/2 - \theta_3$$

Since the distance between the points d and e is equal to the distance between the points c and d, the value Hmax is provided as follows;

$$Hmax = 2 \times H1 \times \sin\theta_8 = 2 \times R0 \times \sin(\theta_0/2) \times \sin(\pi/2 - \theta_3)$$

The height H of the side wall 6a of the cavity is desirable to have a large value so as to suppress the adherence of the injected fuel to the bottom surface of the cavity 6. However, if the height H is greater than the Hmax, the piston 5 is to be long in order not to interfere with a piston pin. Otherwise, a compression ratio of the engine E cannot be maintained at a proper value. Therefore, the height H of the side wall 6a is determined at a smaller value than Hmax.

In operation, whet the stratified combustion is to be accomplished, the valve 16 is closed or slightly opened to interrupt or restrict the intake gas flow in the intake port 12 to form the swirl in the combustion chamber 10 in the clockwise direction in FIG. 2. The swirl is not extinguished in the compression stroke.

Then, the piston 5 strokes upward in the compression stroke. The injector 18 starts the fuel injection at a timing in which the fuel injection is not made over the top end of the cavity, in particular, the injected fuel on the upper spray limit line 30 is not injected outside of the cavity 6 in the sectional view shown in FIG. 8. In this case, the injected fuel is diverted due to the swirl. The distance D1 between the point a and the fuel injection axis line 26 is determined greater than the value D1min. As a result, all the injected fuel can be substantially trapped in th cavity 6 notwithstanding the diversion of the injected fuel due to the swirl. In the sectional view as shown in FIG. 8, the height H of the cavity side wall 6a opposite to the injector 18 is determined between the values Hmin and Hmax so that the injected fuel is substantially prevented from going beyond the side wall 6a of the cavity 6 at the side opposite to the injector 18. On top of that, the adherence of the injected fuel to the bottom surface of the cavity 6 can be effectively suppressed. The injected fuel trapped by the cavity 6 is properly mixed with the intake air and smoothly introduced toward the ignition plug 19 along the side wall 6a of the cavity 6. When the injected fuel is not substantially influenced by the swirl, the distance D2 between the point b and the injection axis line 26 is determined greater than the value D1 as shown in FIG. 2, the injected fuel is properly diffused within the cavity 6. The bottom surface of the cavity 6 is of a flat configuration so that the trapped fuel tends to stay within the cavity 6 rather than flow out thereof In addition, a strong up stream can be produced in th opposite side of the injector within the cavity 6.

The flat bottom surface of the cavity 6 is effected to properly extinguish a tumble (vertical vortex) even when the tumble is produced in the intake stroke. Thus, a down stream due to the tumble can be effectively suppressed in the compression stroke. As a result, the combustion mixture can be smoothly introduced around the ignition plug 19 at an upper position of the combustion chamber 10 even though the cavity 6 is deep.

According to the above embodiment, a local air fuel ratio around the ignition plug 19 can be set at a combustible range of 14–20 and it is possible to improve a stratified condition of the combustion mixture in the combustion chamber 10.

As a result, the stratified combustion and fuel consumption performance can be effectively improved.

In the above embodiment the bottom surface of the cavity 6 is substantially flat and extends horizontally. The side wall 6a of the cavity 6 substantially extends vertically. However, the side wall 6a can be formed to slightly expand upwardly taking account of machining performance. The bottom surface of the cavity 6 may be formed obliquely to extend along an inclined surface 5b at the side of the injector 18. In this case, the side wall 6a may be formed vertically with regard to the inclined bottom surface of the cavity 6 so that the top end of the side wall of the cavity 6 extends close to the ignition plug 19 at a side opposite to the injector 18.

Although the present invention has been explained with reference to a specific, preferred embodiment, one of ordinary skin in the art will recognize that modifications and improvement can be made while remaining within the scope and spirit of the present invention. The scope of the present invention is determined solely by the appended claims.

What is claimed is:

1. A direct injection ignition engine comprising:

an injector disposed at a peripheral portion of a combustion chamber with a pent roof type ceiling, having a fuel injection axis line oblique to a cylinder axis line, a piston with a top surface of a complementary configuration to the pent roof ceiling of the combustion chamber, a cavity formed on the top surface of the piston, having a cavity center line perpendicular to the injection axis line and offset from a center of the piston toward the injector in a plan view, an ignition plug disposed on substantially the cylinder axis of the combustion chamber, a swirl generator which generates a swirl in the combustion chamber so that the fuel is injected from the injector toward the cavity to concentrate a combustion mixture around the ignition plug, the fuel injection axis line coinciding with an axis of the injector and passing a center portion of the top surface of the piston, a distance (D1) between the fuel injection axis line and a point (a) of a peripheral wall portion of the cavity being determined to satisfy the following relationship;

$$D1 \geq L \times \tan(\theta 0/2 + \theta 1)$$

wherein a; a cross point of a peripheral wall portion of the cavity with the cavity center line at a plan view of the top surface of the piston at a side to which the injected fuel is diverted due to the swirl, θ0; spray angle of the fuel injected in the compression stroke, θ1; the maximum value of the diverted angle of the injected fuel, L1; distance between a nozzle of the injector and the cavity center line, a height H of a side wall of the cavity being determined to satisfy the following relationship in a sectional view passing the fuel injection axis line and the cylinder axis, $$H \geq Hmin,$$

wherein Hmin: a length along the cylinder axis line of a distance between a tip end point (c) and a cross point (d), c; a tip end point of the side wall of the cavity on which the upper spray line passes, d; a cross point of the fuel injection axis line with a line with a right angle to the fuel injection line and passing the tip end point (c) when an upper spray limit line passes the tip end point (c) of the side wall of the cavity.

2. A direct injection ignition engine as recited in claim 1 wherein a height H of a side wall of the cavity is determined to satisfy the following relationship in a sectional view passing the fuel injection axis line and the cylinder axis, $$H \leq Hmax$$

wherein Hmax: a length along the cylinder axis line of a distance between the tip end point (c) and a cross point (e), c; the tip end point on the side wall of the cavity on which the upper spray line passes.

e; a cross point of the line with a right angle to the fuel injection line and passing the tip end point (c) with a lower spray limit line when the upper spay limit line passes the tip end point (c) of the side wall of the cavity.

3. A direct injection ignition engine as recited in claim 1 wherein the cavity formed on the top surface is of a configuration of an elongated circle of which length along the cavity center line is longer than the one along the fuel injection axis line, and wherein opposite peripheral wall portions of the cavity facing to each other with regard to the center of the cavity is maximized in a direction along the line with a right angle to the fuel injection axis line.

4. A direct injection ignition engine as ted in claim 1 wherein a bottom surface of the cavity is substantially of a flat.

5. A direct injection ignition engine as recited in claim 2 wherein the cavity formed on the top surface is of a configuration of an elongated circle of which length along the cavity center line is longer than the one along the fuel injection axis line.

6. A direct injection ignition engine as recited in claim 2 wherein a bottom surface of the cavity is substantially of a flat.

7. A direct injection ignition engine as recited in claim 3 wherein a bottom surface of the cavity is substantially of a flat.

8. A direct injection ignition engine as recited in claim 4 wherein the distance D1 from the fuel injection axis line and the point (a) is substantially equal to a distance D2 between the fuel injection axis line and a point (b) on the peripheral wall portion of the cavity opposite the point (a) and wherein the distance D1 and D2 are measured perpendicular to the fuel injection axis line.

* * * * *